(12) United States Patent
Iwai

(10) Patent No.: US 7,029,185 B2
(45) Date of Patent: Apr. 18, 2006

(54) OPTICAL CHIP MODULE AND OPTICAL CHIP MODULE DEVICE

(75) Inventor: Junichi Iwai, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 20 days.

(21) Appl. No.: 10/836,189

(22) Filed: May 3, 2004

(65) Prior Publication Data
US 2004/0228583 A1  Nov. 18, 2004

(30) Foreign Application Priority Data
May 13, 2003 (JP) ............... 2003-134489

(51) Int. Cl.
G02B 6/42 (2006.01)
G02B 6/12 (2006.01)
G02B 6/30 (2006.01)

(52) U.S. Cl. ............... 385/88; 385/14; 385/49
(58) Field of Classification Search ............ 385/14, 385/49, 88–94
See application file for complete search history.

(56) References Cited

U.S. PATENT DOCUMENTS

| 6,517,259 B1 * | 2/2003 | Murata ............ 385/92 |
| 6,695,492 B1 * | 2/2004 | Ide et al. ............ 385/88 |
| 6,798,953 B1 * | 9/2004 | Cohen et al. ............ 385/49 |
| 6,907,151 B1 * | 6/2005 | Yunus ............ 385/14 |

FOREIGN PATENT DOCUMENTS

JP  8-220383  8/1996

* cited by examiner

Primary Examiner—John D. Lee
Assistant Examiner—Tina M Wong
(74) Attorney, Agent, or Firm—Staas & Halsey LLP

(57) ABSTRACT

An optical chip module has an optical chip on an element forming face with a light emitting or a light receiving element and terminals for electrical connection with the element and an optical fiber optically bonded to the element with its end face abutting the element. The outer circumference of the optical fiber has interconnect patterns extending from the end face, and in the axial direction, of the optical fiber and electrically connected with the terminals. Terminals of the optical chip are connected with the interconnect patterns at the end face of the optical fiber, intersecting circumferential lines of the end face of the optical fiber abutting against the element forming face and bonded thereto.

8 Claims, 5 Drawing Sheets

OPTICAL CHIP MODULE AND OPTICAL CHIP MODULE DEVICE

BACKGROUND OF THE INVENTION

1. Field of the Invention

The present invention relates to an optical chip module comprised of a combination of a planar light emitting laser diode or photodiode or other optical chip for emitting light or receiving light and an optical fiber and to an optical chip module device comprised of this optical chip module mounted on a board.

2. Description of the Related Art

An optical chip module using a planar light emitting laser diode or photo diode or other optical chip for emitting light or receiving light, as shown in FIG. 6, has an optical fiber 20 arranged so that its end face faces the light emitting face or light receiving face of the optical chip 10 and projects or receives light between the optical chip 10 and optical fiber 20. In FIG. 6, 12 indicates terminals of the optical chip 10, 13 bonding wires bonded to the terminal 12, and 14 connection electrodes of the mounting board. Further, FIG. 7 shows an element forming face of the optical chip 10. The element forming face is provided at its center with a light emitting part or light receiving part constituted by an element part 15. Terminals 12 are provided outside of the element part 15. Reference numerals 16 show interconnect patterns for electrical connection of the element part 15 and terminals 15.

With an optical chip module comprised of a combination of the above planar light emitting laser diode or photo diode or other light emitting element and an optical fiber, an arrangement enabling projection and reception of light between the optical chip 10 and optical fiber 20 without providing any optical lenses is possible. In this case, the end face of the optical fiber 20 is arranged as close as possible to the element part 15 of the optical chip 10.

With the conventional optical chip module shown in FIG. 6, however, the optical chip 10 and the external circuits are electrically connected by wire bonding, so it is necessary to arrange the optical fiber 20 so as not to interfere with the bonding wires 13. There was the problem that it was necessary to arrange the element forming face of the optical chip 10 and the end face of the optical fiber 20 away from each other. Accordingly, loss would occur when projecting or receiving light between the optical chip 10 and the optical fiber 20 or, due to arrangement of the optical chip 10 and optical fiber 20 away from each other, it was difficult to position the optical fiber 20 to match with the optical axis of the optical chip 10.

SUMMARY OF THE INVENTION

An object of the present invention is to provide a optical chip module enabling direct connection of the optical chip and optical fiber, facilitating positioning of the optical chip and optical fiber, enabling suppression of optical coupling loss, and enabling easy mounting on a board for formation of a module device and an optical chip module device using this optical chip module.

To attain the above object, according to a first aspect of the invention, there is provided an optical chip module comprised of an optical chip provided on an element forming face with a light emitting or light receiving element part and terminals for electrical connection with the element part and an optical fiber optically bonded by coupling the optical fiber to the element part in the state with its end face made to abut positioned with the element part, the outer circumference of the optical fiber being provided with interconnect patterns extending from the end face of the optical fiber toward the axial direction of the optical fiber and electrically connected with the terminals, terminals of the optical chip being provided in an arrangement positioned with the interconnect patterns at the end face of the optical fiber and intersecting circumferential lines of the end face of the optical fiber abutting against the element forming face, the optical chip and optical fiber being bonded in the state with the end face of the optical fiber abutting against the element forming end face, and the terminals and interconnect patterns being electrically connected.

Preferably, a conductor material is coated at the terminals and the outer surfaces of the interconnect patterns, the terminals and interconnect patterns are electrically connected through the conductive material, and the optical chip and optical fiber are integrally bonded by the conductive material. Alternatively, an adhesive is coated at the outer circumference along the end face of the optical fiber abutting against the element forming face, and the optical chip and optical fiber are fixed by bonding through the adhesive. Alternatively, a dummy terminal is provided at the element forming face of the optical chip in an arrangement intersecting the outer circumferential line of the end face of the optical fiber, a conductive material or adhesive is coated between the dummy terminal and the outer surface of the optical fiber, and the optical chip and optical fiber are bonded. Alternatively, the conductive material coated between the terminals and the outer surface of the optical fiber are formed as connection bumps enabling mounting to a board by flip-chip connection.

According to a second aspect of the invention, there is provided an optical chip module device comprised of an optical chip module mounted on a board, the optical chip module is mounted on the board by an optical fiber of the optical chip module being passed through a mounting hole provided at the board, a conductive material being coated at an edge of the mounting hole between interconnect patterns provided at the board and interconnect patterns provided at the outer surface of the optical fiber, the interconnect patterns provided at the board and the interconnect patterns provided at the outer surface of the optical fiber being electrically connected, and the optical fiber being bonded with the substrate. According to a third aspect of the invention, there is provided an optical chip module device comprised of an optical chip module mounted on a board wherein an optical fiber of the optical chip module is passed through a mounting hole provided in the board, and connection bumps are bonded with interconnect patterns provided on the board at the edge of the mounting hole, whereby the optical chip module is mounted on the board in a state with interconnect patterns provided at the board and interconnect patterns provided at an outer surface of the optical fiber electrically connected.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1A:
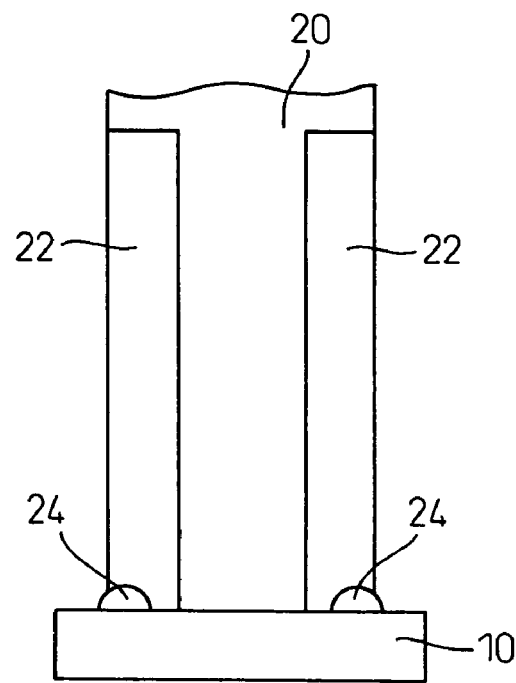
FIGS. 1A and 1B are a standing view and a plan view of the configuration of an optical chip module according to the present invention.
Figure 1B:
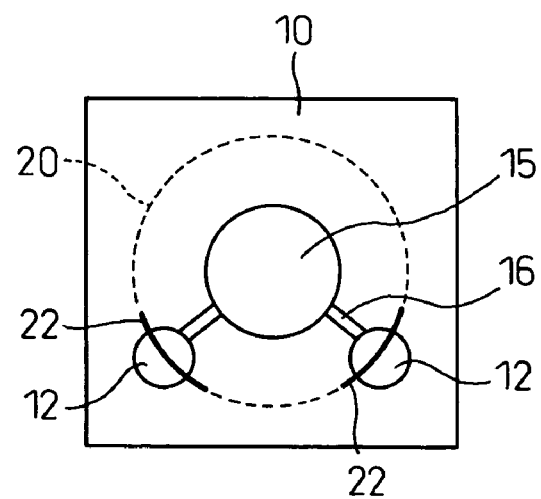

Preferred embodiments of the present invention will be described in detail below while referring to the attached figures. FIGS. 1A and 1B are views explaining the configuration of an optical chip module according to the present invention. FIG. 1A shows the shape of an optical chip module comprised of an optical chip 10 and an optical fiber 20 as seen from the side direction, while FIG. 1B shows the planar arrangement at an element forming face of the optical chip 10. As shown in FIG. 1A, the optical chip module according to the present invention is comprised of an optical chip 10 on the element forming face of which an end face of an optical fiber 20 is made to abut and the optical chip 10 and optical fiber 20 bonded in that state.

As shown in FIG. 1B, the element forming face of the optical chip 10 is formed with an element part 15 serving as a light emitting part or light receiving part and terminals electrically connected with the element part 15 through interconnect patterns 16 so as to be exposed at the element forming face. When bonding the optical chip 10 and the optical fiber 20, the center of the element part 15 and the center of the core of the optical fiber 20 are positioned for bonding. The terminals 12 formed at the element forming face of the optical chip 10 are provided so that the outer circumferential line of the end face of the optical fiber 20 (broken line in FIG. 1B) passes over the terminals 12 when positioning the center of the optical fiber 20 at the center of the element part 15 for bonding. The outer circumferential line of the end face of the optical fiber 20 is made to pass over the terminals 12 so that the interconnect patterns 22 formed at the outer surface of the optical fiber 20 and terminals 12 are electrically connected.

On the other hand, the interconnect patterns 22 formed at the outer surface of the optical fiber 20 are set at positions on the outer circumference of the optical fiber 20 matched with positions of the terminals 12 formed on the element forming face of the optical chip 10. In the present embodiment, the interconnect patterns 22 are formed to predetermined lengths in parallel to the axial direction of the optical fiber 20 from the end face of the optical fiber 20. The outer surface of the optical fiber 20 is formed with interconnect patterns 22 so that the optical chip module can be mounted while electrically connecting the optical chip 10 and external circuits through the interconnect patterns 22. Therefore, it is sufficient to arrange the interconnect patterns 22 connected to the terminals 12 so as not to short-circuit. It is not necessary to provide them in parallel to the axis of the optical fiber 20.

In the optical chip module of the present embodiment, the end face of the optical fiber 20 is made to abut against the element forming face of the optical chip 10 for bonding, while the interconnect patterns 22 formed at the outer surface of the optical fiber 20 and the terminals 12 are electrically connected. Therefore, when bonding the optical fiber 20 and the optical chip 10, the optical axis of the optical fiber 20 and the center of the element part 15 of the optical chip 10 are aligned and in that state solder, conductive paste, or another conductive material 24 is coated at the locations where the terminals 12 and the interconnect patterns 22 contact each other (boundary positions) to electrically connect the interconnect patterns 22 and the terminals 12. Note that the conductive material 24 is designed not to obstruct projection or reception of light at least between the optical fiber 20 and the element part 15 and so as not to enter between the end face of the optical fiber 20 and the element forming face.

The conductive material 24 has the action of electrically connecting the interconnect patterns 22 and terminals 12 and the action of integrally bonding the optical fiber 20 and optical chip 10. The optical chip 10 is a small sized chip, so by using a conductive material 24 having bondability, it is possible to easily integrally bond the optical fiber 20 and optical chip 10. When the bonding force is insufficient, the conductive material 24 is used to bond the optical fiber 20 and the optical chip 10, then the surroundings of the location where the optical fiber 20 and optical chip 10 abut are coated with an adhesive having an electrical insulating property and the adhesive cured so as to strongly bond the two members. Note that the conductive material 24 is coated between the terminals 12 and the outer surface of the interconnect patterns 22 to make the electrical connection between the terminals 12 and the interconnect patterns 22 more reliable, but when it is possible to electrically connect the terminals 12 and interconnect patterns 22 by just making the end face of the optical fiber 20 abut against the element forming face, the method of just bringing the optical fiber 20 into abutment with the element forming face and bonding it by an adhesive is also possible.

The optical chip module shown in FIGS. 1A and 1B is structured with the end face of the optical fiber 20 brought into abutment with and mounted to the element forming face of the optical chip 10, so this is the closest mode of bonding between the optical chip 10 and the optical fiber 20. Due to this, it becomes possible to reduce the optical loss at the connection part of the optical chip 10 and the optical fiber 20. Note that even if cutting the end face of the optical fiber 20 at a slant to suppress the optical reflection at the end face of the optical fiber 20, it is possible to bring the end face of the optical fiber 20 into abutment with the element forming face of the optical chip 10 for bonding. In this case, the element forming face of the optical chip 10 becomes slightly slanted from the vertical with respect to the axial direction of the optical fiber 20, but bonding of the optical fiber 20 and the optical chip 10 does not become a problem.

The optical chip module shown in FIGS. 1A and 1B is easy to assemble since it is assembled by the operation of bonding the optical chip 10 and optical fiber 20 in the state positioned with each other. Further, after assembly, the optical chip 10 and optical fiber 20 are always correctly positioned with respect to the optical axis, so optical adjustment is not required, handling is easy, and utilization as an optical chip module for various applications becomes possible. Further, a state in which the interconnect patterns 22 provided at the outer surface of the optical fiber 20 and the optical chip 10 are electrically connected is obtained, so electrical connection between the optical chip module and outside circuits becomes easy and use mounting the optical chip module on a board becomes easy.

Figure 2A:
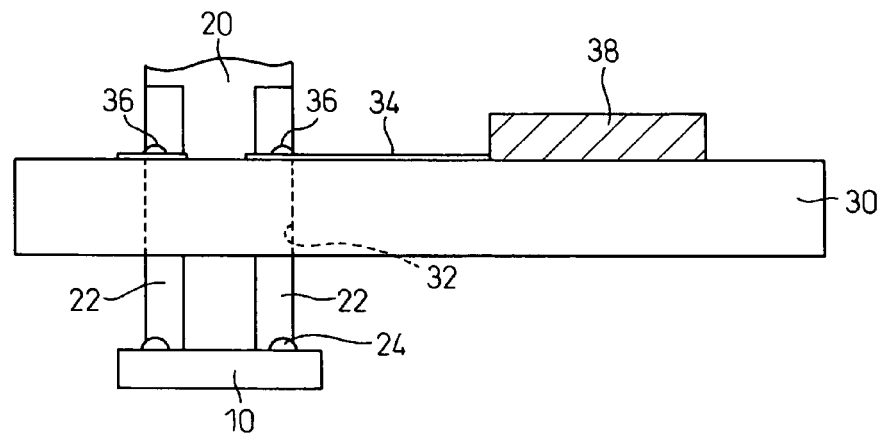
FIGS. 2A and 2B are a standing view and a plan view of the configuration of an optical chip module device according to the present invention.
Figure 2B:
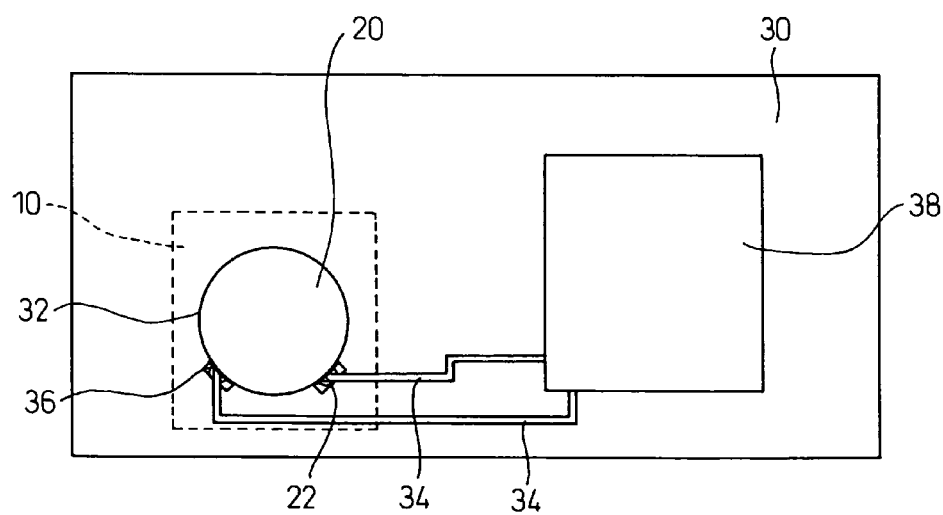

FIGS. 2A and 2B show an example of an optical chip module device comprised of the above optical chip module mounted on a board. In the same figure, 30 indicates a board mounting the optical chip module. For assembly, the optical fiber 20 of the optical chip module is passed through the mounting hole 32 provided through the board 30 and a conductive adhesive or solder or other conductive material 36 is used for electrically connecting the interconnect patterns 34 and the interconnect patterns 22 provided at the outer surface of the optical fiber 20 at the edges of the mounting hole 32. The conductive material 36 acts to electrically connect the interconnect patterns 22 and the interconnect patterns 34 and acts to mount the optical fiber 20 on the board 30 and support the optical chip module at the board 30.

The interconnect patterns 34 are provided with connection electrodes formed somewhat wide for electrical connection with the interconnect patterns 22 close to the edges of the mounting hole 32 aligned with the positions of the interconnect patterns 22, 22 formed at the outer surface of the optical fiber 20. By aligning the connection electrodes and interconnect patterns 22 of the optical fiber 20 and coating a conductive material 36 between the connection electrodes and the interconnect patterns 22, it is possible to electrically connect the interconnect patterns 22 of the optical fiber 20 and interconnect patterns 34 of the board 30 and mount the optical fiber 20 on the board 30 for support. When the bonding force of the conductive material 36 is not sufficient, it is also possible to coat an adhesive having an electrical insulating property at the edges of the mounting hole to strongly fix the optical fiber 20 by the mounting hole 32. Reference numeral 38 is a driver amp or other circuit component of an optical chip 10 mounted on the board 30. The optical chip module can be mounted in the state with the optical chip 10 and the circuit component 38 electrically connected.

Figure 3A:
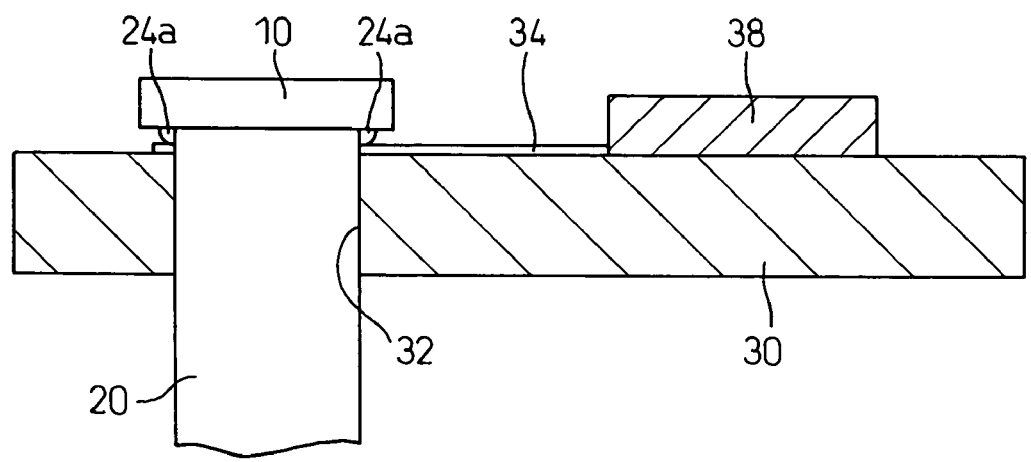
FIGS. 3A and 3B are a cross-sectional view and a plan view of another configuration of an optical chip module device according to the present invention.
Figure 3B:
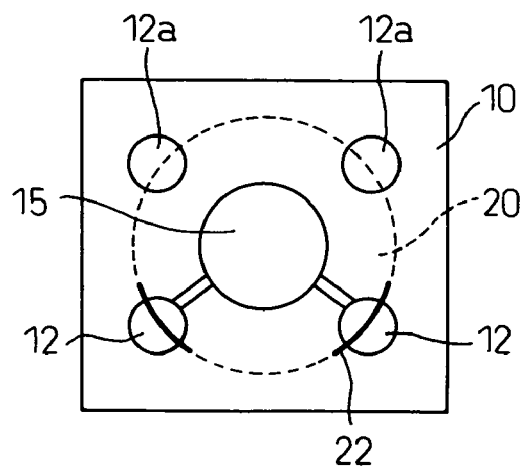

FIGS. 3A and 3B show another example of an optical chip module device comprised of the optical chip module mounted on a board 30. In this example, an optical chip 10 of the optical chip module is mounted on the board by flip-chip connection. That is, as shown in FIG. 3A, when passing the optical fiber 20 through a mounting hole 32 provided in the board 30 and connecting the optical chip 10 and interconnect patterns 34 of the board 30 to form an optical chip module, the bump shapes of conductive material 24 are used as connection bumps when bonding with the board 30. FIG. 3A shows the state when bonding the optical chip module so as to connect with the interconnect patterns 34 through the conductive material 24a when mounting the optical chip module on the board 30. It is possible to form the connection electrodes at the ends of the interconnect patterns 34 aligned with the arrangement of the terminals 12 in advance, coat the conductive material 24a on the connection electrodes, position the conductive material 24 of the optical chip module at the connection electrodes, and mount by flip-chip connection.

FIG. 3B shows an example of provision of dummy terminals 12a at the element forming face of the optical chip 10 so that the optical chip 10 is bonded at a slant when mounting an optical chip module on a board by flip-chip connection. The dummy terminals 12a are provided at equal intervals in the circumferential direction so as to intersect with the outer circumferential line of the end face of the optical fiber 20 in the same way as the terminals 12 electrically connected with the element parts 15. When bonding the optical fiber 20 to the element forming face of the optical chip 10, if coating a conductive material 24 on the dummy terminals 12a as well, forming four bumps on the element forming face of the optical chip 10 by a conductive material 24, and mounting the module on the board 30, it is possible to reliably connect the interconnect patterns 34 and optical chip 10 without the optical chip 10 tilting.

Note that when forming dummy terminals 12a such as shown in FIG. 3B at the element forming face of the optical chip 10 and bonding the optical fiber 20 and optical chip 10, if bonding the optical fiber 20 and the optical chip 10 even at the positions of the dummy terminals 12a along with the terminals 12, the bond between the optical fiber 20 and optical chip 10 becomes more reliable. When forming dummy interconnect patterns at the outer surface of the optical fiber 20 aligned with the positions of formation of the dummy terminals 12a and bonding the optical fiber 20 and optical chip 10, it is also possible to simultaneously bond the dummy terminals 12a and dummy interconnect patterns. The method of utilizing the dummy terminals 12a to bond the optical fibers 20 and optical chips 10 is not limited to the case of the mounting method shown in FIGS. 3A and 3B and is effective also in the mounting method shown in FIGS. 2A and 2B.

Note that as shown in FIG. 3A, when forming interconnect patterns 34 at the same side of the board 30 as the side where the optical chip 10 is arranged, it is possible to electrically connect the optical chip 10 and the interconnect patterns 34 formed at the board 30 without forming the interconnect patterns 22 at the outer surface of the optical fiber 20. However, the method of forming the interconnect patterns 22 at the outer surface of the optical fiber 20 is effective in improving the reliability of the electrical connection of the interconnect patterns 34 formed at the board 30 and optical chip 10. Further, in the mounting method shown in FIG. 3A, when the interconnect patterns 34 are provided at the side of the board 30 opposite to the side where the optical chip 10 is arranged, it is sufficient to electrically connect with the interconnect patterns 34 through the interconnect patterns 22 provided at the outside surface of the optical fiber 20.

The optical chip module according to the present invention is characterized in that interconnect patterns 22 are formed at the outer surface of the optical fiber 20 and the optical chip 10 and interconnect patterns 34 of the board 30 are electrically connected through the interconnect patterns 22. In this case, the optical fiber 20 acts as a support for supporting the interconnect patterns 22. As a method for forming the interconnect patterns on the outer surface of the optical fiber 20, it is possible to form a conductor layer on the outer circumference of the optical fiber by plating etc. and etch the conductor layer so as to form predetermined patterns.

Figure 4:
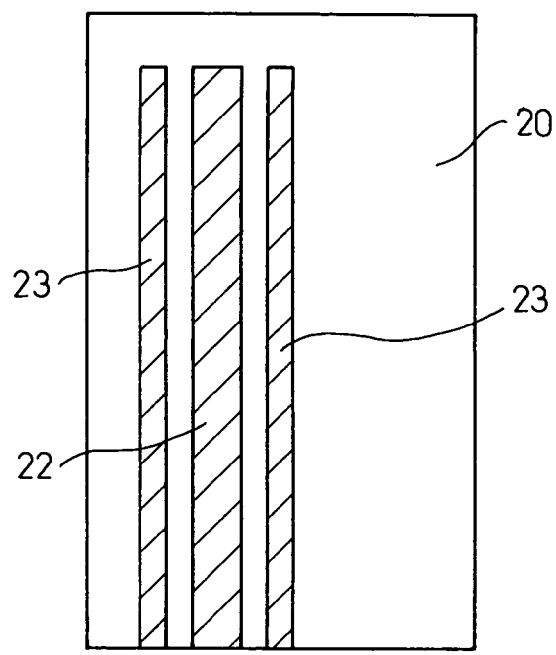
FIG. 4 is a standing view of an example of interconnect patterns of a coplanar line structure.

FIG. 4 shows the formation of ground lines 23 sandwiching and parallel to an interconnect line 22 for realizing a coplanar line structure when forming an interconnect line 22 at the outer surface of the optical fiber 20. According to the method of formation of interconnect patterns 22 at the outer surface of the optical fiber 20, such a coplanar line structure is also possible. By adjusting the impedance of the interconnect pattern, it is possible to obtain an interconnect structure superior in transmission characteristics of a high speed signal.

Figure 5:
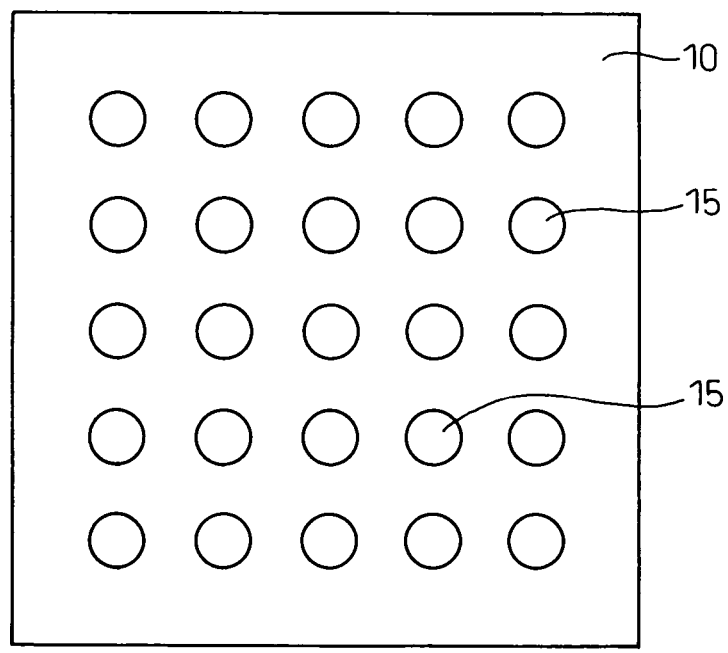
FIG. 5 is a plan view of an example of an optical chip comprised of a large number of element parts formed in an array.
Figure 6:
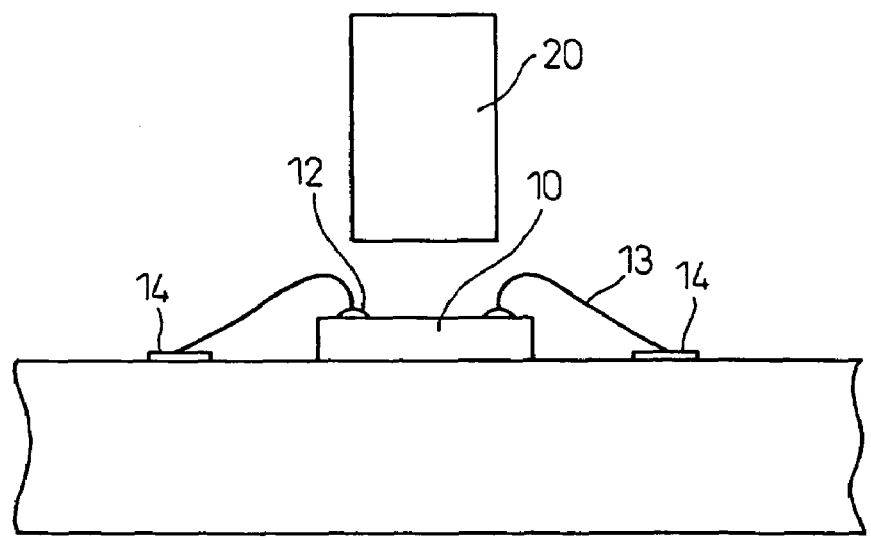
FIG. 6 is a standing view of a conventional structure of an optical chip module.
Figure 7:
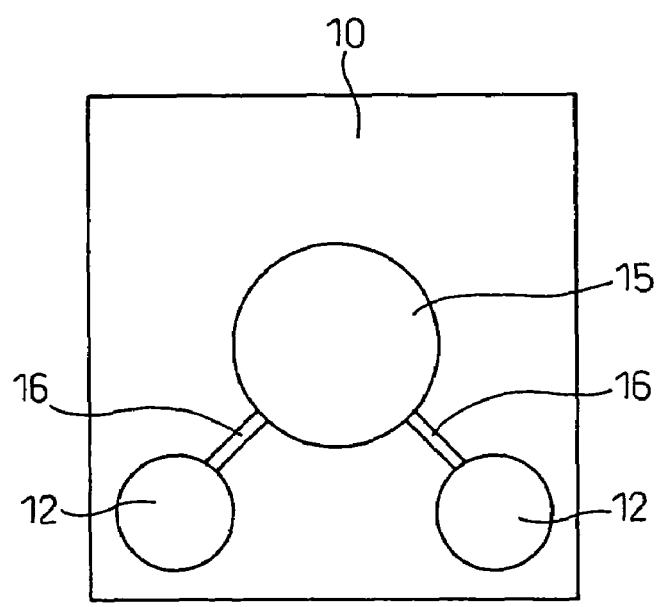
FIG. 7 is a plan view of the configuration of an element forming face of an optical chip.

Note that FIG. 5 shows, as a planar light emitting laser diode, an example of an optical chip 10 on the end face of which a large number of element parts 15 are arranged in an array. When a large number of element parts 15 are arrayed at fine intervals in this way, optical fibers 20 are arranged corresponding to the element parts 15 and electrically connecting with the element parts 15 by wire bonding is not realistic. As opposed to this, according to the optical chip module according to the present invention, electrical connection with the element parts 15 becomes possible just by arranging optical fibers 20 positioned at the element parts 15, while electrical connection with the external circuits becomes possible through interconnect patterns 22 provided at the outer surface of the optical fiber 20.

Summarizing the effects of the invention, the optical module according to the present invention has the end face of the optical fiber directly abutting against and bonded with the element forming face of the optical chip, so it is possible to provide a compact module and possible to provide a module minimizing the loss in projection and reception of light between the optical chip and optical fiber. Further, the module is formed with the optical chip and the optical axis of the optical fiber aligned in advance, so it is possible to assemble a module device without complicated work such as optical adjustment. Further, since interconnect patterns are formed at the outer surface of the optical fiber in this configuration, electrical connection becomes easy and mounting on a board etc. becomes easy. Further, the optical chip module device according to the present invention enables compact mounting of a module comprised of a combination of an optical chip and optical fiber and can be provided as a module device mounting an optical chip easy to mount and easy to handle.

While the invention has been described with reference to specific embodiments chosen for purpose of illustration, it should be apparent that numerous modifications could be made thereto by those skilled in the art without departing from the basic concept and scope of the invention.

What is claimed is:

1. An optical chip module of an optical chip provided on an element forming face with a light emitting or light receiving element and terminals for electrical connection with said element, comprising:
    an optical fiber optically bonded by coupling the optical fiber to said element with its end face abutting said element;
    the outer circumference of said optical fiber having interconnect patterns extending from the end face, and in an axial direction, of the optical fiber and electrically connected with the terminals;
    terminals of said optical chip being positioned with the interconnect patterns at the end face of said optical fiber and intersecting circumferential lines of the end face of the optical fiber abutting against said element forming face and bonded thereto;
    said terminals and interconnect patterns being electrically connected; and
    an adhesive coated at the outer circumference along the end face of the optical fiber abutting against said element forming face, the optical chip and optical fiber being fixed by bonding through the adhesive.

2. An optical chip module of an optical chip provided on an element forming face with a light emitting or light receiving element and terminals for electrical connection with said element, comprising
    an optical fiber optically bonded by coupling the optical fiber to said element with its end face abutting said element;
    the outer circumference of said optical fiber having interconnect patterns extending from the end face, and in an axial direction, of the optical fiber and electrically connected with the terminals;
    terminals of said optical chip being positioned with the interconnect patterns at the end face of said optical fiber and intersecting circumferential lines of the end face of the optical fiber abutting against said element forming face and bonded thereto;
    said terminals and interconnect patterns being electrically connected; and
    a conductive material coated on said terminals and the outer surface of said interconnect patterns, said terminals and interconnect patterns being electrically connected through the conductive material, and the optical chip and optical fiber being integrally bonded by the conductive material; and
    an adhesive coated at the outer circumference along the end face of the optical fiber abutting against said element forming face, the optical chip and optical fiber being fixed by bonding through the adhesive.

3. An optical chip module of an optical chip provided on an element forming face with a light emitting or light receiving element and terminals for electrical connection with said element, comprising
    an optical fiber optically bonded by coupling the optical fiber to said element with its end face abutting said element;
    the outer circumference of said optical fiber having interconnect patterns extending from the end face, and in an axial direction, of the optical fiber and electrically connected with the terminals;
    terminals of said optical chip being positioned with the interconnect patterns at the end face of said optical fiber and intersecting circumferential lines of the end face of the optical fiber abutting against said element forming face and bonded thereto;
    said terminals and interconnect patterns being electrically connected; and
    a dummy terminal at the element forming face of said optical chip, intersecting the outer circumferential line of the end face of the optical fiber, a conductive material or adhesive being coated between the dummy terminal and the outer surface of the optical fiber, bonding the optical chip and optical fiber.

4. An optical chip module of an optical chip provided on an element forming face with a light emitting or light receiving element and terminals for electrical connection with said element, comprising
    an optical fiber optically bonded by coupling the optical fiber to said element with its end face abutting said element;
    the outer circumference of said optical fiber having interconnect patterns extending from the end face, and in an axial direction, of the optical fiber and electrically connected with the terminals;
    terminals of said optical chip being positioned with the interconnect patterns at the end face of said optical fiber and intersecting circumferential lines of the end face of the optical fiber abutting against said element forming face and bonded thereto; and
    said terminals and interconnect patterns being electrically connected; and a conductive material coated at said terminals and the outer surface of said interconnect patterns, said terminals and interconnect patterns being electrically connected through the conductive material, and the optical chip and optical fiber being integrally bonded by the conductive material; and a dummy terminal at the element forming face of said optical chip, intersecting the outer circumferential line of the end face of the optical fiber, a conductive material or adhesive being coated between the dummy terminal and the outer surface of the optical fiber, bonding the optical chip and optical fiber.

5. An optical chip module as set forth in claim 3, wherein the conductive material coated between said terminals and the outer surface of the optical fiber are formed as connection bumps enabling mounting to a board by flip-chip connection.

6. An optical chip module as set forth in claim 4, wherein the conductive material coated between said terminals and the outer surface of the optical fiber are formed as connection bumps enabling mounting to a board by the flipchip connection system.

7. An optical chip module device comprised of an optical chip module as set forth in claim 5 mounted on a board, wherein:

an optical fiber of said optical chip module is passed through a mounting hole provided in said board, and connection bumps are bonded with interconnect patterns provided on the board at the edge of the mounting hole, whereby the optical chip module is mounted on the board in a state with interconnect patterns provided at said board and interconnect patterns provided at an outer surface of said optical fiber electrically connected.

8. An optical chip module device comprised of an optical chip module as set forth in claim 6 mounted on a board, wherein:

an optical fiber of said optical chip module is passed through a mounting hole provided in said board, and connection bumps are bonded with interconnect patterns provided on the board at the edge of the mounting hole, whereby the optical chip module is mounted on the board in a state with interconnect patterns provided at said board and interconnect patterns provided at an outer surface of said optical fiber electrically connected.

* * * * *